Patented Nov. 23, 1943

2,335,027

UNITED STATES PATENT OFFICE 2,335,027

PROCESS FOR PRODUCING UNSATURATED ALCOHOLS

John J. Ritter, Yonkers, N. Y., assignor to Standard Oil Development Company, a corporation of Delaware No Drawing. Application September 7, 1940,
Serial No. 355,823

15 Claims. (Cl. 260—638)

The present invention relates to a method for the production of unsaturated alcohols.

According to the present invention, aliphatic olefins, such as butene-2, particularly aliphatic tertiary olefins having a methyl group attached to the tertiary carbon atom, are converted into unsaturated alcohols through the expedient of reacting such olefins with an aldehyde at elevated temperatures in the absence of catalysts. Such aliphatic tertiary olefins possess the general formula—

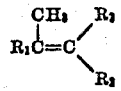

where $R_1$ is an aliphatic hydrocarbon radical and $R_2$ and $R_3$ are aliphatic hydrocarbon radicals or hydrogen atoms. Examples of unsaturated hydrocarbons coming within this general class are isobutylene, diisobutylene, 2-methylbutene-1, isoprene, trimethyl ethylene, etc.

The aldehydes used in carrying out the process of this invention may be aliphatic, such as formaldehyde, acetaldehyde, propionaldehyde, or aromatic, such as benzaldehyde; or any compound, such as paraformaldehyde (trioxymethylene), paraldehyde, or other aldehyde polymers, which will decompose to yield an aldehyde, may be used. The amount of aldehyde used should be at least equal to the amount of olefin used on a molar basis.

While the reaction will no doubt proceed at room temperature, its speed is so slow at this temperature as to be virtually imperceptible. Therefore, higher temperatures than room temperature are required in order to obtain satisfactory reaction rates. The upper limit of suitable temperatures is the temperature at which the aldehyde decomposes; the preferred temperature range is 100° C. to 250° C. A pressure should be maintained in the reaction vessel and this pressure should be at least equal the vapor pressure of the hydrocarbon at the temperature of the reaction. The time required for complete reaction varies from a few minutes to several hours, and normally is 2 to 16 hours.

The principal product of the reaction is an unsaturated alcohol having the general formula—

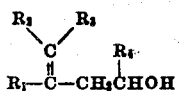

in which $R_1$ is an aliphatic hydrocarbon radical, such as methyl, ethyl, propyl, etc., $R_2$ and $R_3$ are aliphatic hydrocarbon radicals or hydrogen atoms, and $R_4$ is an aliphatic (methyl, etc.) or aromatic (phenyl, etc.) hydrocarbon radical or a hydrogen atom. Such unsaturated alcohols can be isolated from a reaction mixture and purified by any of the several methods known to the art. A very efficient and effective method of isolating and purifying the unsaturated alcohol is to esterify it with a mono-, di-, or tri-basic acid, such as boric, lauric or adipic acid, remove the other compounds present by distillation, and saponify the ester to recover the pure alcohol.

The following examples are given for the purpose of illustrating but in no way limiting the invention:

Example 1

112 parts of diisobutylene and 30 parts of paraformaldehyde were placed in a reactor equipped with a stirrer and reflux condenser. The mixture was stirred and heated at about 180° C. for 2 hours. The mixture was then permitted to cool and 73 parts of adipic acid were then added and the mixture stirred in order to form the corresponding ester. The other compounds present were then removed by distillation; the residual ester was then saponified by dilute caustic, and the resulting mixture was fractionated, yielding 100 parts of diisobutenyl carbinol boiling at 190° C.–192° C.

Example 2

Diisobutylene and para-formaldehyde, in equimolecular proportions, were placed in a sealed tube, and the tube was heated in a Carius furnace for 16 hours at 175° C.–190° C. The bomb contents were then cooled and dried. In distillation of the dried reaction mixture, a fraction boiling at 189° C.–190° C. was obtained. This fraction contained diisobutenyl carbinol, and was formed in a 26.5% yield. Some unreacted dimer and formaldehyde were also recovered.

What is claimed is:

1. The process of producing alkenyl alcohols which consists essentially in reacting one mol of an aliphatic olefin with one mol of a saturated aldehyde selected from the group consisting of aliphatic and aryl aldehydes, at a temperature between 100° C. and 250° C.

2. The process of producing alkenyl alcohols having the general formula:

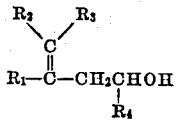

in which $R_1$ is an aliphatic hydrocarbon radical, $R_2$ and $R_3$ are selected from the group consisting of hydrogen atoms and aliphatic hydrocarbon radicals, and $R_4$ is selected from the group consisting of hydrogen atoms, and aliphatic and aromatic hydrocarbon radicals, which consists essentially in reacting an aliphatic tertiary olefin having a methyl group attached to the tertiary carbon atom with a saturated aldehyde selected from the group consisting of aliphatic and aryl aldehydes at a temperature between 100° C. and 250° C.

3. Process of producing alkenyl alcohols having the general formula:

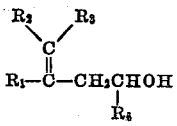

in which $R_1$ is an aliphatic hydrocarbon, $R_2$ and $R_3$ are selected from the group consisting of hydrogen atoms and aliphatic hydrocarbon radicals and $R_4$ is selected from the group consisting of hydrogen atoms and aliphatic and aromatic hydrocarbon radicals, which consists essentially in reacting an aliphatic tertiary olefin having a methyl group attached to the tertiary carbon atom with a saturated aliphatic aldehyde at a temperature between 100° C. and 250° C.

4. The process of producing alkenyl alcohols which consists essentially in reacting one mol of an aliphatic tertiary olefin having a methyl group attached to the tertiary carbon atom with one mol of a saturated aliphatic aldehyde at a temperature between 100° C. and 250° C.

5. The process of producing alkenyl alcohols having the general formula:

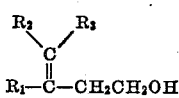

in which $R_1$ is an aliphatic hydrocarbon radical, and $R_2$ and $R_3$ are selected from the group consisting of hydrogen atoms and aliphatic hydrocarbon radicals, which consists essentially in reacting an aliphatic tertiary olefin having a methyl group attached to the tertiary carbon atom with formaldehyde at a temperature between 100° C. and 250° C.

6. The process of producing alkenyl alcohols which consists essentially in reacting diisobutylene with a saturated aldehyde at a temperature between 100° C. and 250° C.

7. The process of producing diisobutenyl carbonyl which consists essentially in reacting diisobutylene with formaldehyde at a temperature between 170° C. and 180° C.

8. The process of producing alkenyl alcohols having the general formula:

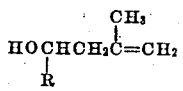

in which R is a substituent selected from the group consisting of hydrogen atoms, and aliphatic and aromatic hydrocarbon radicals, which consists essentially in reacting isobutylene with a saturated aldehyde selected from the group consisting of aliphatic and aryl aldehydes at a temperature between 100° C. and 250° C.

9. Process of producing alkenyl alcohols having the general formula:

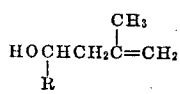

in which R is chosen from the group consisting of hydrogen atoms and aliphatic and aromatic radicals, which consists essentially in reacting isobutylene with a saturated aliphatic aldehyde at a temperature between 100° C. and 250° C.

10. The process of producing isobutenyl carbinol having the formula:

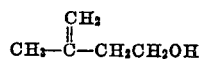

which consists essentially in reacting isobutylene with formaldehyde at a temperature between 100° C. and 250° C.

11. The process of producing alkenyl alcohols having the general formula:

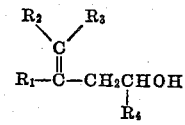

in which $R_1$ is an aliphatic hydrocarbon radical, $R_2$ and $R_3$ are selected from the group consisting of hydrogen atoms, and aliphatic hydrocarbon radicals, and $R_4$ is selected from the group consisting of hydrogen atoms, and aliphatic and aromatic hydrocarbon radicals, which consists essentially in reacting an aliphatic tertiary olefin having a methyl group attached to the tertiary carbon atom and a saturated aldehyde selected from the group consisting of aliphatic and aryl aldehydes for from 0.1 to 16 hours, at 100°–250° C., under pressure at least equivalent to the vapor pressure of the olefin at the reaction temperature, and recovering the unsaturated alcohol.

12. Process of producing alkenyl alcohols having the general formula:

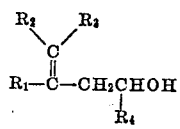

in which $R_1$ is an aliphatic hydrocarbon radical, $R_2$ and $R_3$ are selected from the group consisting of hydrogen atoms and aliphatic hydrocarbon radicals, and $R_4$ is selected from the group consisting of hydrogen atoms, and aliphatic and aromatic hydrocarbon radicals, which consists essentially in reacting one mol of an aliphatic tertiary olefin having a methyl group attached to the tertiary carbon atom and one mol of a saturated aliphatic aldehyde for from 0.1 to 16 hours at 100° C.–250° C., under pressure at least equivalent to the vapor pressure of the olefin at the reaction temperature, and recovering the unsaturated alcohol.

13. The process of producing diisobutenyl carbinol having the formula:

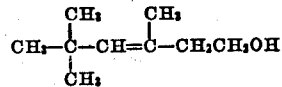

which consists essentially in reacting one mol of diisobutylene with one mol of formaldehyde for from 0.1 to 16 hours, at 170° C.–180° C., under pressure at least equivalent to the vapor pressure of diisobutylene at the reaction temperature, and recovering the unsaturated alcohol.

14. The process of producing isobutenyl carbinol having the formula:

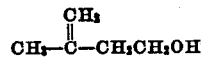

which consists essentially in reacting one mol of isobutylene with one mol of formaldehyde at 100°–110° C., under pressure at least equivalent to the vapor pressure of isobutylene at the reaction temperature, and recovering the unsaturated alcohol.

15. The process of producing alkenyl alcohols which comprises reacting an alkenyl hydrocarbon with a saturated aldehyde selected from the group consisting of aliphatic and aryl aldehydes in the absence of a catalyst at a temperature between 100° C. and 250° C.

JOHN J. RITTER.